(No Model.)  5 Sheets—Sheet 1.
C. E. BUELL.
MODE AND DEVICE FOR CHARGING AND DISCHARGING SECONDARY BATTERIES.
No. 261,513. Patented July 18, 1882.
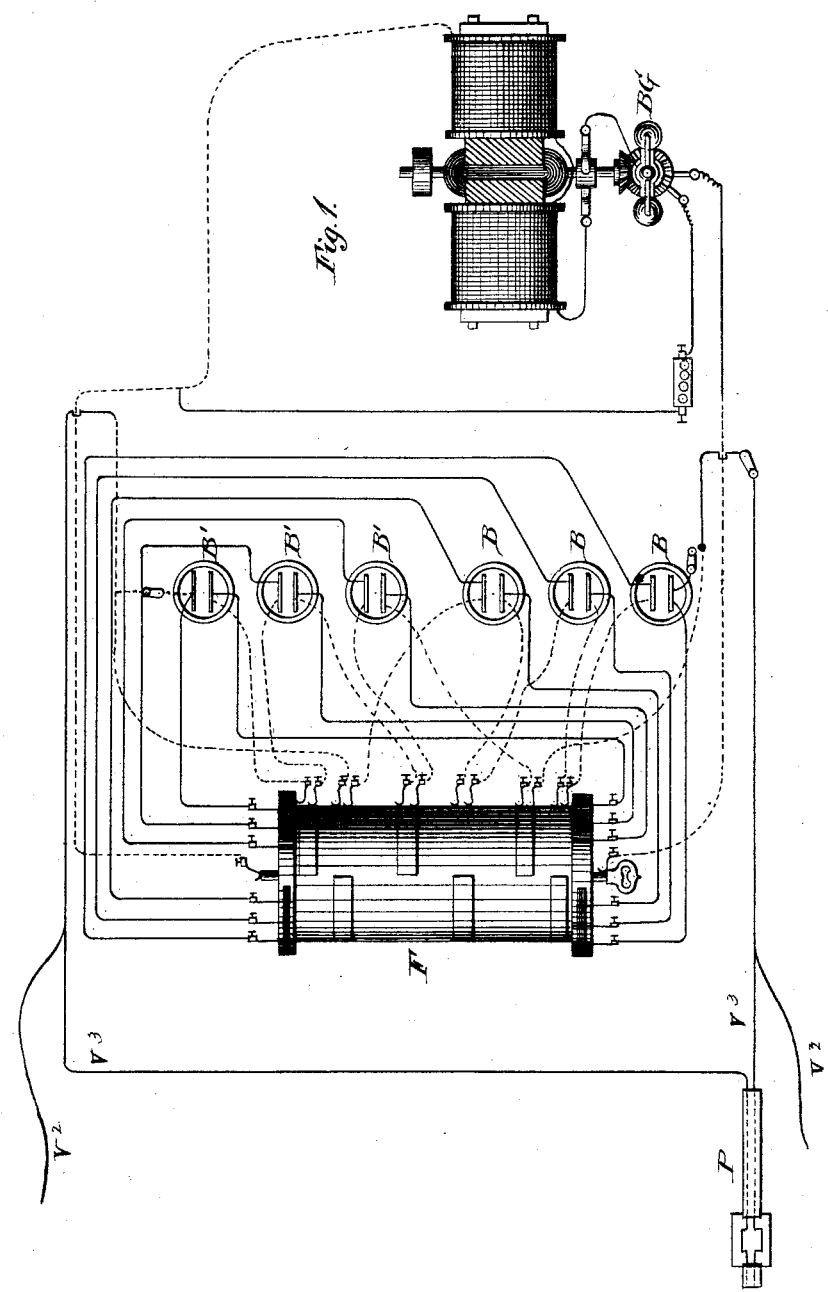

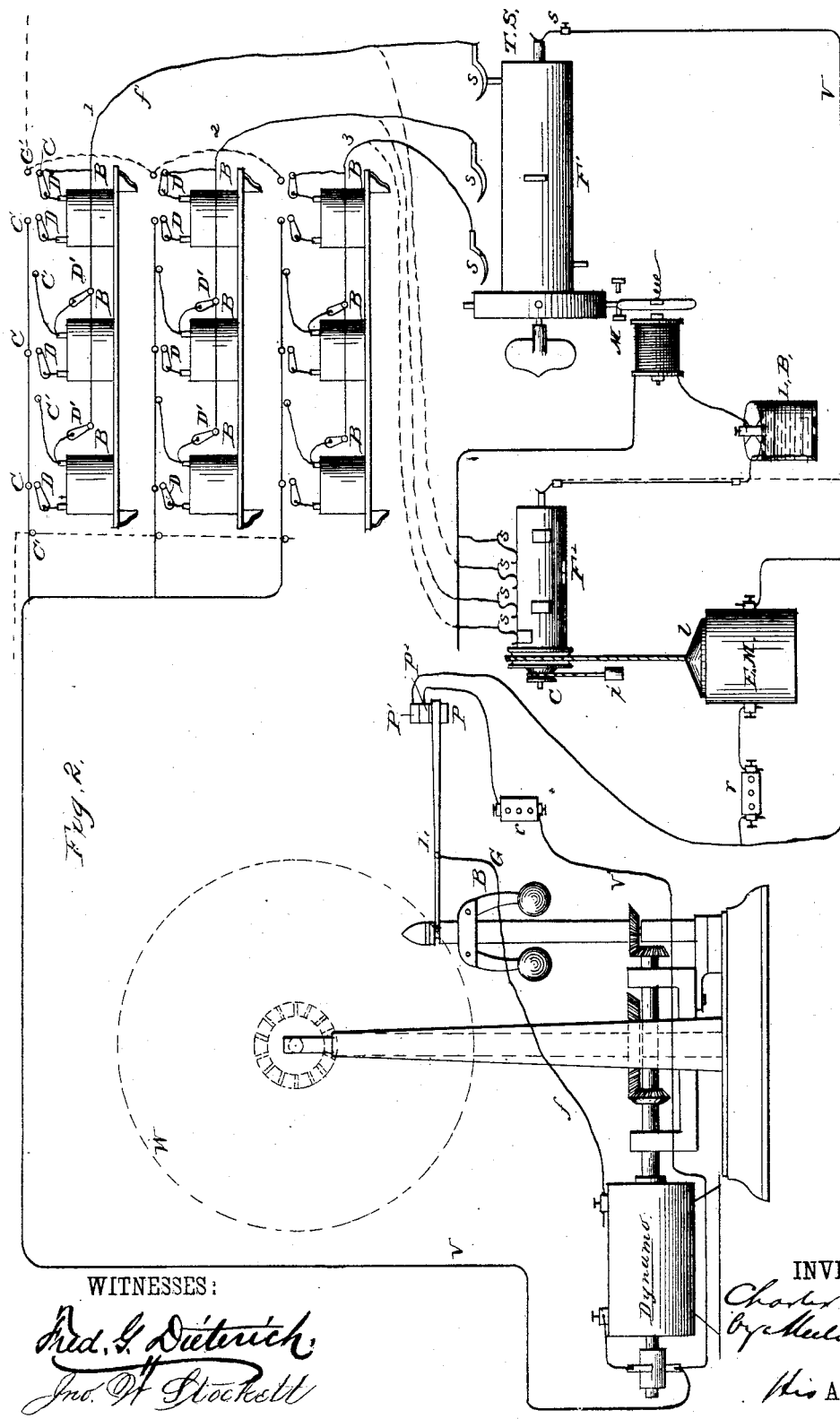

(No Model.)  C. E. BUELL.  5 Sheets—Sheet 3.
MODE AND DEVICE FOR CHARGING AND DISCHARGING SECONDARY BATTERIES.
No. 261,513.  Patented July 18, 1882.
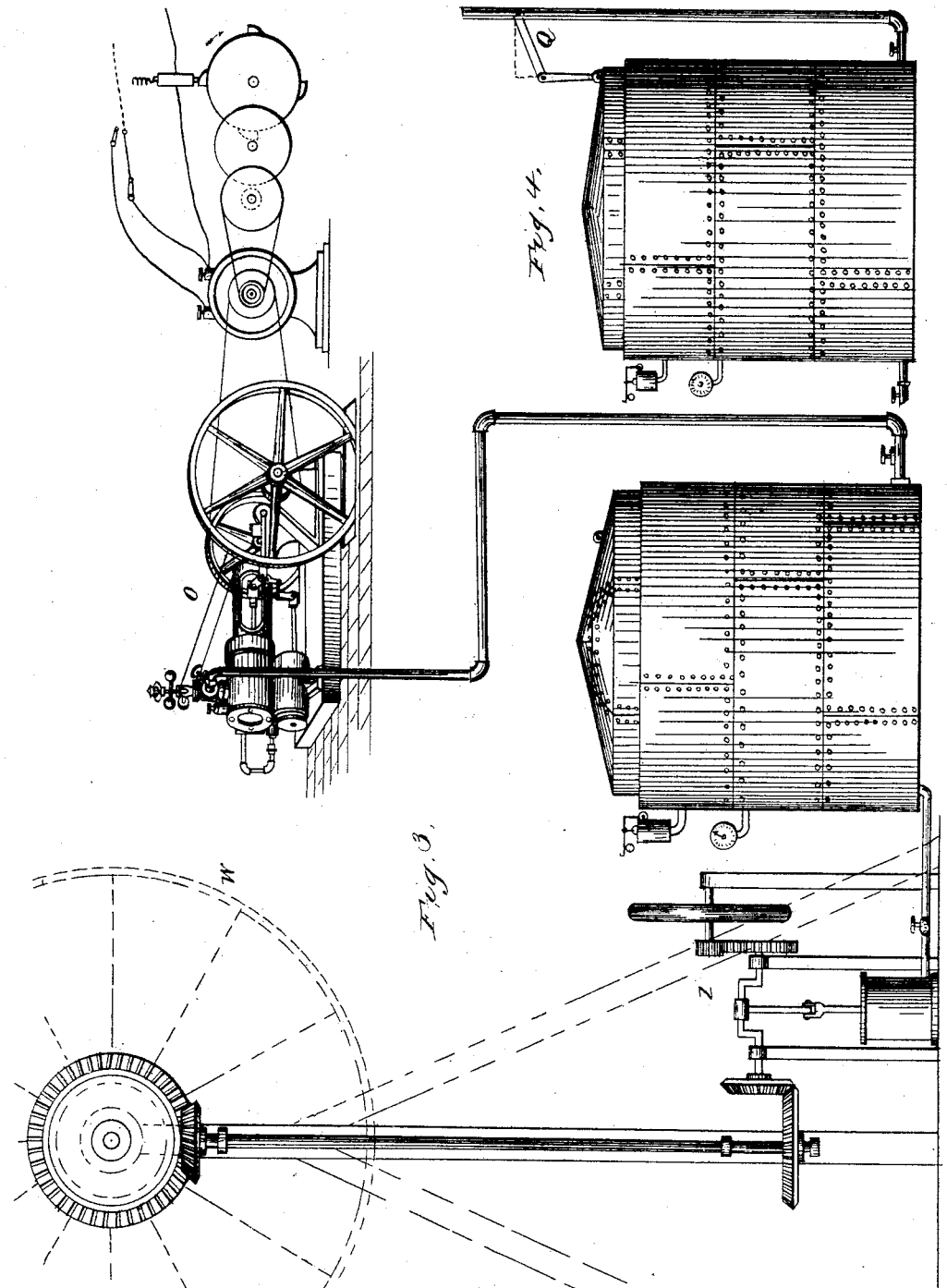

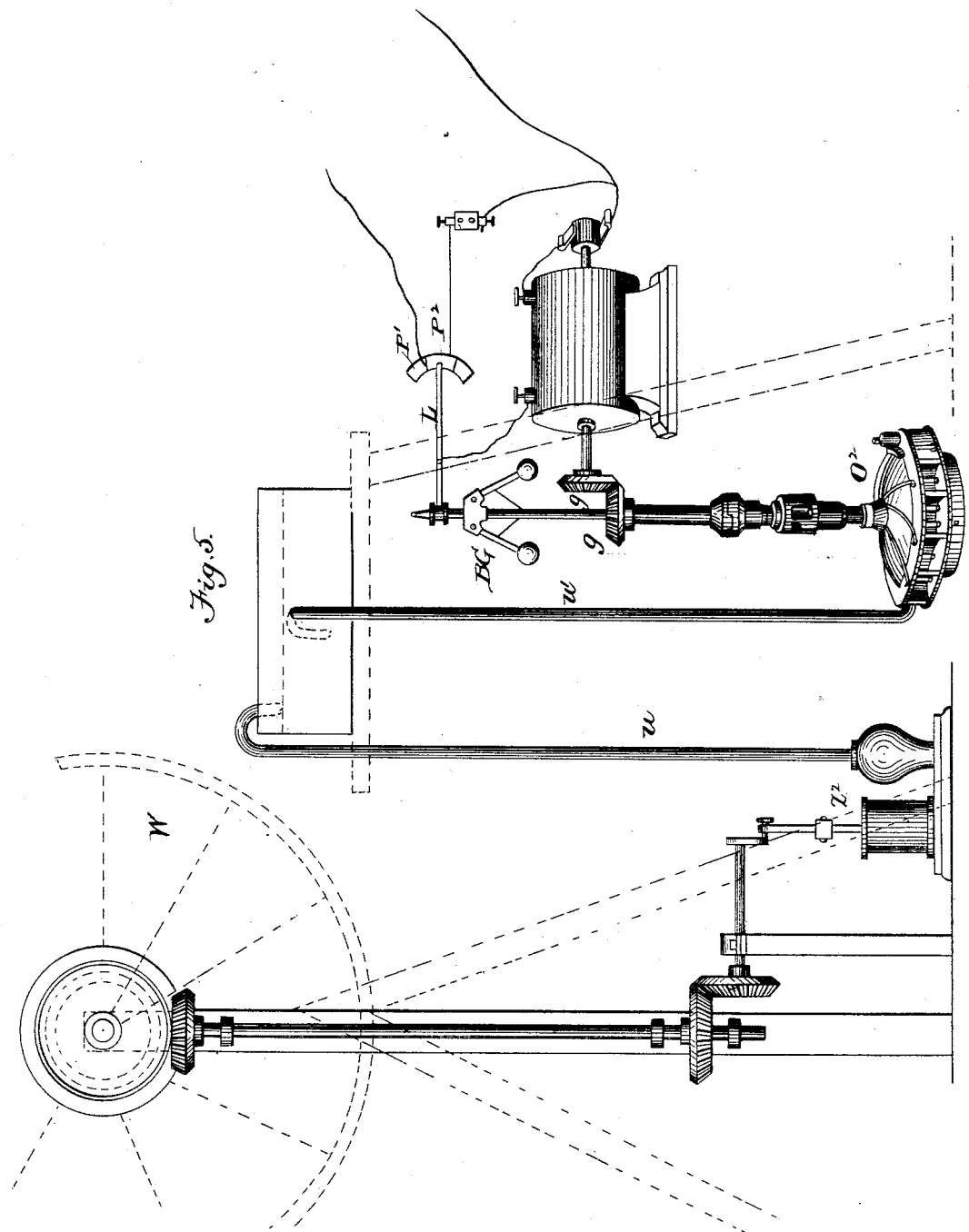

(No Model.) 5 Sheets—Sheet 5.
C. E. BUELL.
MODE AND DEVICE FOR CHARGING AND DISCHARGING SECONDARY BATTERIES.
No. 261,513. Patented July 18, 1882.

WITNESSES:
Fred. G. Dieterich
J. H. Church

INVENTOR.
Charles E. Buell,
by Melville Church,
ATTORNEY.

UNITED STATES PATENT OFFICE.

CHARLES E. BUELL, OF NEW HAVEN, CONNECTICUT.

MODE AND DEVICE FOR CHARGING AND DISCHARGING SECONDARY BATTERIES.

SPECIFICATION forming part of Letters Patent No. 261,513, dated July 18, 1882.

Application filed May 19, 1882. (No model.)

*To all whom it may concern:*

Be it known that I, CHARLES E. BUELL, of New Haven, in the county of New Haven and State of Connecticut, have invented certain new and useful Improvements in the Mode of and Devices for Charging and Discharging Secondary Batteries, of which the following is a specification.

In Letters Patent No. 256,450, dated April 11, 1882, I have claimed the combination of an electrical generating-machine, a developing-circuit, a charging-circuit, two series of secondary batteries, and a working or discharging circuit with devices for placing said machine charged into the charging-circuit with one or more secondary batteries and withdrawing said machine from said charging-circuit and leaving the charging-circuit open, with circuit-controlling devices made operative by the action of said machine to switch the charging-circuit from one of said series of secondary batteries and connect said charging-circuit with another of said series of secondary batteries after a predetermined flow of current from said generating-machine has taken place, and with means for placing the secondary batteries alternately in the charging-circuit to be charged and in the working-circuit in tension series to be discharged; but the switching devices and connections shown and described in said patent are such that the batteries of each series, when arranged for discharging into the working-circuit, are not only coupled so as to discharge together in tension series, but also so as to discharge among themselves, thereby causing more or less diminution or discharge into the working-circuit. This discharge of the batteries among themselves results from the fact that the batteries of each series are adapted to be charged through sub-branches of a common main branch of the charging-circuit proper, besides having connections which adapt them to be coupled together for discharge in tension series; and the switching mechanism, when operated to cause the discharge of the batteries of either series, cuts off the appropriate main branch of the charging-circuit from the charging-circuit proper and couples said pairs together in the working-circuit in tension series; but the connections to the sub-branches of the said main branch remaining unbroken, sub-circuits are formed which cause the batteries of the series to discharge among themselves. In my present invention, however, each battery of a series is adapted to be charged directly through a separate main branch of the charging-circuit, instead of through a sub-branch of the main branch, common to all batteries of the series, as heretofore, and the consequence is that when each series of batteries is discharging, with the appropriate charging-branches disconnected from the charging-circuit proper, the said batteries do not discharge among themselves, but only into the working-circuit coupled for intensity.

That my present improvements may be fully understood, I will now proceed to describe them, and point them out particularly in the claims.

In the accompanying drawings the letters and figures represent corresponding parts in each.

Figure 1 is a plan view of a dynamo-electric machine, developing and charging circuits, and secondary batteries arranged according to my invention. Fig. 2 is an elevation of the dynamo-machine propelled by a wind-wheel, with automatic switch for controlling the developing-circuit and charging-circuit, intermediate switches made operative by electrolytic action, and magnets and secondary batteries, all arranged according to my invention. Fig. 3 is an elevation of a wind-wheel connected to and propelling an air-compressing pump, which by its action fills the expansible air-holder under pressure for propelling the dynamo-machine through the intermediate propulsion of the engine connected therewith, the whole arranged and operating to charge secondary batteries in accordance with my invention. Fig. 4 is a view of the air-holder and automatic devices for turning the air under pressure from air-holder to the engine at a predetermined degree of charge in the air-holder. Fig. 5 is a view of a wind-wheel actuating a pump which fills a tank, which at a predetermined depth overflows by a siphon and propels a dynamo-electric generator through the intermediate action of a water-wheel, the switching devices being controlled directly from the motor to facilitate charging secondary batteries according to my invention. Fig. 6 represents a dynamo-electric machine propelled by a water-wheel in a stream, and arranged to charge secondary batteries in accordance with my invention, the currents from the secondary batteries being conveyed to the remote point by means of a cable to be used, or recharge other secondary batteries to get constant currents.

In Fig. 1 the ball-governor B G is shown in plan view. This is arranged to automatically introduce the dynamo charged into the closed charging-circuit when the machine has reached a predetermined speed, and its operation is fully described in my Patent No. 255,248, bearing date March 21, 1882. It is shown in combination with two series of secondary batteries, B B B and B' B' B', together with the automatic switch apparatus F, which automatically and at predetermined intervals places the said batteries alternately in the charging-circuit in multiple arc to be charged and in the working-circuit V² in tension series to be discharged, and is fully described in my application No. 61,853, bearing date May 19, 1882, the only difference being that in said application each pair of plates of a series of batteries are adapted to be charged successively, whereas in the switch herein shown all the pairs of plates comprising a series are interposed in the charging-circuit successively and so as to be charged all together simultaneously in multiple arc. The working-circuit is shown divided into the circuits V² and V³, the circuit-wire V³ being insulated and contained in a pipe, P, with a metallic return-circuit.

Fig. 2 represents a dynamo-electric machine geared to a wind-wheel, W, and having an automatic switch, which is controlled by the speed of the wind-wheel through the action of the ball-governor B G and lever L. A developing-circuit, V', is completed over wire $f$, lever L, plate P², and return-circuit including adjustable resistance $r$. An increase of speed acts to place the lever L in contact with plate P' before wholly breaking contact with plate P², and thus splitting the circuit of the machine momentarily, and then breaking the developing-circuit and leaving the machine included in the closed charging-circuit with the secondary batteries B B B, the charging-currents of the machine being greater at the moment of being turned into the batteries than when normally charging the batteries, because of the double circuit afforded at the instant prior to opening the developing-circuit.

As it requires more power to start a dynamo-electric machine on a closed circuit, it is desirable to start it on an open circuit; but as it requires an appreciable period of time to charge the field-of-force magnets when the circuit of the machine is closed after it has attained its speed, and as the secondary batteries to be charged are usually partially charged after their first using, and will act instantly to charge the field-of-force magnets in the wrong direction and at the expense of their residuary charge, if the machine is introduced into the charging-circuit before being highly charged, the foregoing described modes of introducing the machine charged into the charging-circuit are advantageous.

The manner of arranging the batteries to be charged successively or in multiple arc has the advantage of offering the least resistance to the machine-current, and admits of employing a small power to charge a large battery, a generating-machine of quantity producing a current of sufficient energy to charge one secondary element being available to charge successively a battery which, discharging in tension series, gives the energy of a very much more powerful dynamo.

Although there is a percentage of loss of power in converting the current of the machine into a working-current of a secondary battery, it is small, and the latter is sufficiently better in its action to repay the small percentage of loss, while in many instances it is available as the utilized power of the wind, tides, and moving trains, and if it required one horse-power of the initial power to afford the equivalent of one-half a horse-power in the secondary effects it would in those instances cited have cost only the outlay for apparatus.

In Fig. 2 there is shown a rotary switch, F², and contacts S S S, arranged to open and close the circuit of the local battery L B, which includes the electro-magnet M, the armature of which acts as an escapement to the rotary switch F', which is actuated by a concealed clock mechanism, and which successively interposes the series 1, 2, and 3 of secondary batteries in the charging-circuit in multiple arc by its revolutions. The rotary switch F² is actuated by the counterpoise-weight $i$ and the weight of the extensible gas-holder 1 of the electrolytic cell E M. The action of a diverted portion of the charging-current, decomposing the liquid contents of the cell, fills the holder with gas, which causes it to be raised by the pressure of gas and weight $i$ rotating the switch F². The contacts S S S may connect, as shown in dotted lines, direct with the secondary batteries without the intervention of the switch F' and local circuit. By this combination of devices the irregular power of the wind-wheel W is converted into a constant power without attendance, for through the automatic action of the lever L the electrical generating-machine is withdrawn from the charging-circuit when the speed falls below normal, and is interposed in the charging-circuit again when a desired speed is attained, thereby always giving an effective charging-current when in circuit with the secondary batteries, and the rotary switch F² withdraws a series of secondary batteries from the charging-circuit after it has received a predetermined flow of current, and interposes another series to become charged. When the switches D D D D are turned into contact with the points C C C the batteries B B B are included in the charging-circuit in multiple arc, and when the switches D D D D are turned to contacts C' C' C' C' and the switches D' D' turned off their contacts the series of secondary batteries are connected into the working-circuit (shown in dotted lines) in tension series. Any of the well-known switches may be employed instead of those shown.

Fig. 3 represents a windmill, W, arranged to operate the air-compressor Z, which compresses air into the extensible air-holder, from which it may be used to drive one or more distant motors, O, which in turn propel the dynamo-machine.

Fig. 4 is an air-holder, with a valve-lever, Q, arranged to turn the air from the air-holder to the motor O automatically when the holder becomes filled to a given degree. Various ways of arranging automatic valves are obvious.

Figure 6:
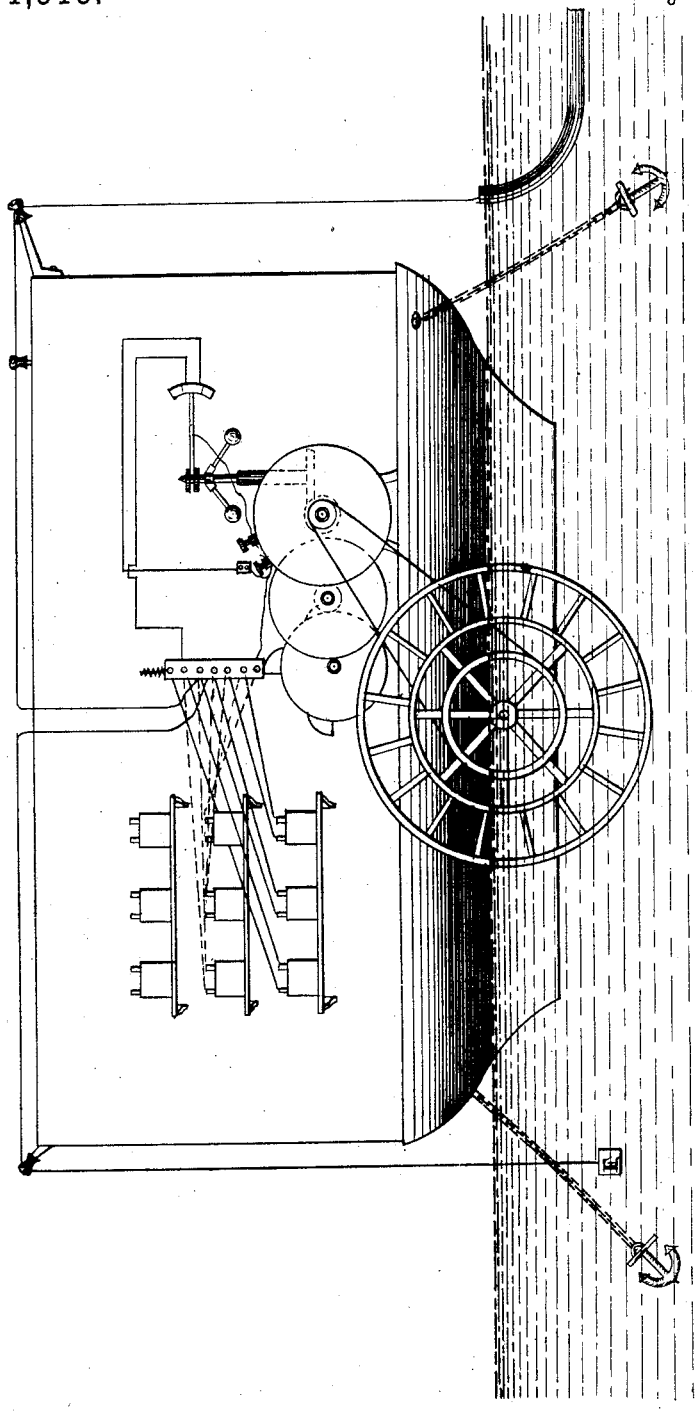

Fig. 5 shows the wind-wheel W geared to the water-pump $Z^2$, and by its motion fills, or nearly so, the tank through pipe $u$. When the water in the tank reaches a point above the curve in pipe $u'$, which penetrates through the tank to its interior, a siphon is formed, and the water is forced with great energy through the water-wheel $O^2$, which drives the dynamo-electric machine with good effect to charge the secondary batteries, as described and shown. The beveled gears $g$ $g$ can be varied so as to give the dynamo great speed. The ball-governor B G is shown upon the shaft of the water-wheel disconnected from the dynamo, except through the wheels $g$ $g$, and actuates the lever L to change the currents from the developing-circuit at $p^2$ to a charging-circuit at P', as shown in Fig. 2.

Fig. 6 represents a barge carrying a dynamo-machine with speeding-down mechanism, described in a previous application, for switching a series of secondary batteries out of the charging-circuit into a working and a second series into the charging circuit after a predetermined number of revolutions of the dynamo, with a ball-governor to leave the charging-circuit open when the speed of the dynamo-machine falls below a given velocity, and to place the dynamo charged into the charging-circuit when a desired speed is attained. The initial power in this modification is a wheel actuated by incoming and outgoing tides, a constant motion being imparted in one direction by well-known mechanism for such uses. (Not shown.)

Several wheels may be employed with one barge, and their aggregate product in electricity be conveyed to shore over a cable insulated and submerged.

Tide-wheels of various constructions have been extensively used for other purposes heretofore, and any of the well-known tide-wheels may be used in connection with my electrical storage apparatus.

The wheels driven by wind can be placed upon house-tops, where horizontal wheels would be less objectionable on account of their better appearance. From such wheels, with an extra supply-battery, the house could be illuminated, light machinery propelled, bells operated, and clocks maintained.

When desired to apply the system to a portion of a city or town the wind-wheels or tide-wheels located outside of the section to be lighted can supply secondary batteries located at remote points from the electrical generating-machine and its propelling-power, and where currents of quantity, with energy sufficient to charge secondary batteries are conveyed over ordinary conductors there is no risk of life or property by accidental contact with the wires, the currents of energy being confined to circuits not liable to come in contact with other conductors.

The employment of quantity-currents of but sufficient energy to charge secondary batteries requires less expensive conductors and insulation, whether used on overhead lines or with conductors buried in the earth.

I do not confine myself to the forms of intermediate switches shown for connecting an electrical generating-machine and secondary batteries to change the charging-circuit after a given charging of the secondary batteries has taken place.

What I claim is—

1. The combination of the following elements, namely: an electrical generating-machine, a developing-circuit, a charging-circuit, two series of secondary batteries, and a working or discharging circuit, with devices, substantially as described, for placing said machine charged into the charging-circuit with one or more secondary batteries, and for withdrawing said machine from said charging-circuit and leaving the charging-circuit open, with circuit-controlling devices, substantially as described, made operative by the action of said machine to switch the charging-circuit from one of said series of secondary batteries and connect said charging-circuit with another series of secondary batteries after a predetermined flow of current from said generating-machine has taken place, independent branches of the charging-circuit connected to each of the secondary batteries of a series, and switching devices, substantially as described, for alternately connecting the independent charging-branches of one series to the charging-circuit proper and at the same time disconnecting the charging-branches of the other series of batteries from the charging-circuit proper and interposing said other series in the working-circuit coupled for intensity, the whole operating in the manner and for the purpose set forth.

2. The combination, with the wind-wheel W, of the electrical generating-machine, the automatic switch L, adapted to act with the movement of the wind-wheel to open the charging-circuit V when the speed of the windmill falls below predetermined velocity, switch devices, substantially as described, for changing the charging-circuit after a given action of the machine has taken place, independent branches of the charging-circuit connected to each of the secondary batteries of a series, and switching devices, substantially as described, for alternately connecting the independent charging-branches of one series to the charging-circuit proper and disconnecting the charging-branches of the other series of batteries from the charging-circuit proper and interposing said other series in the working-circuit coupled for intensity, as set forth.

3. The combination, with an electrical generating-machine, of the wind-wheel W, the pump $Z^2$, the pipe $n$, the reservoir or tank, the siphon $N'$, the water-wheel $O^2$, switch devices, substantially as described, for changing the charging-circuit after a given action of the machine has taken place, two series of secondary batteries, independent branches of the charging-circuit connected to each of the secondary batteries of a series, and switching devices, substantially as described, for alternately connecting the independent charging-branches of one series to the charging-circuit proper and disconnecting the charging-branches of the other series of batteries from the charging-circuit proper and interposing said other series in the working-circuit coupled for intensity, as set forth.

CHARLES E. BUELL.

Witnesses:
FRED F. CHURCH,
MELVILLE CHURCH.